Figure 1:
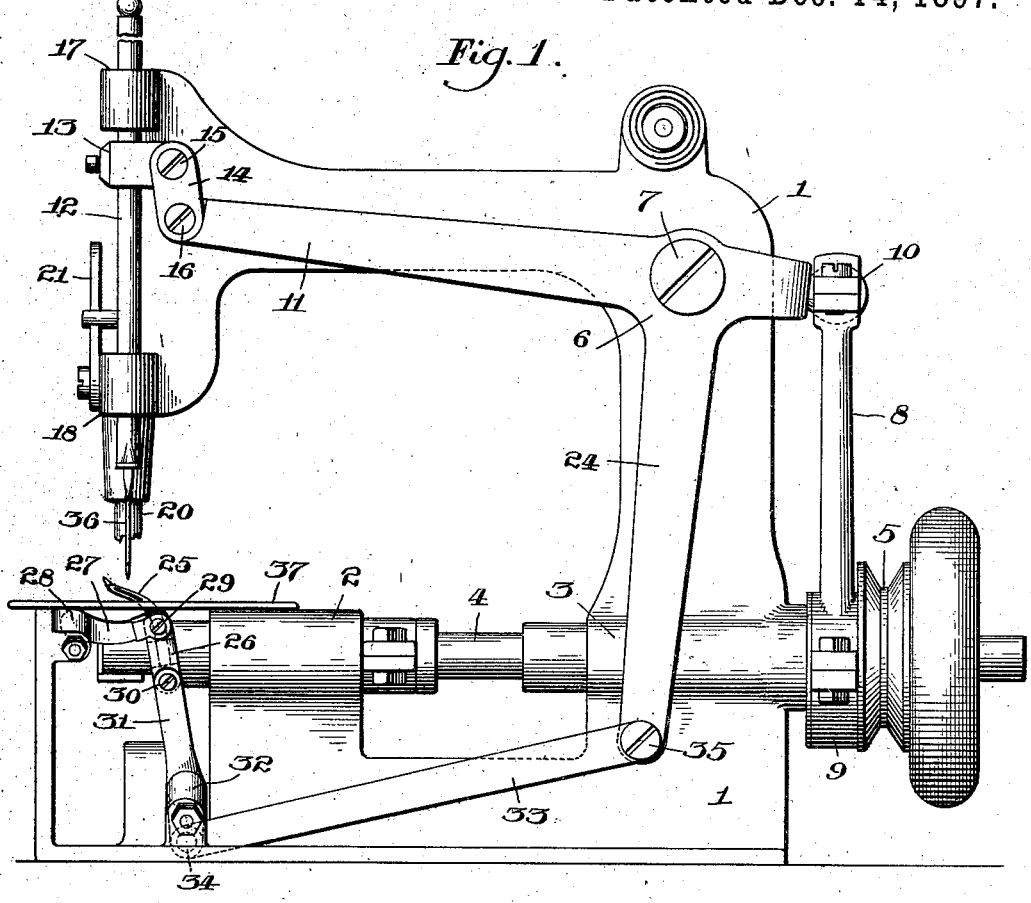

(No Model.) 4 Sheets—Sheet 1.

W. H. HUGG & C. SCHÜTZ.
SEWING MACHINE.

No. 595,479. Patented Dec. 14, 1897.

Witnesses.
A. V. Groupe
Thomas S. Gates

Inventors
Wm. H. Hugg
Conrad Schütz
By Charles N. Butler
Attorney.

(No Model.) 4 Sheets—Sheet 2.

W. H. HUGG & C. SCHÜTZ.
SEWING MACHINE.

No. 595,479. Patented Dec. 14, 1897.

Witnesses.
A. V. Groupe
Thomas Hate

Inventors
Wm. H. Hugg
Conrad Schütz
By Charles N. Butler
Attorney.

(No Model.) 4 Sheets—Sheet 3.
W. H. HUGG & C. SCHÜTZ.
SEWING MACHINE.
No. 595,479. Patented Dec. 14, 1897.
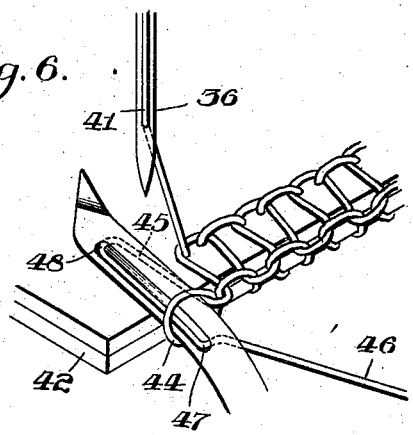
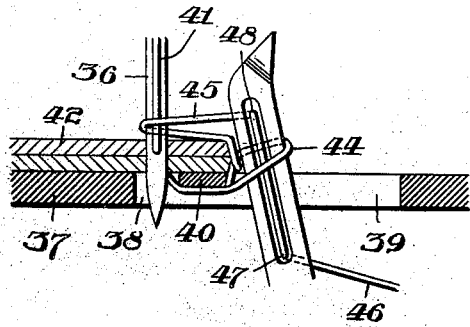
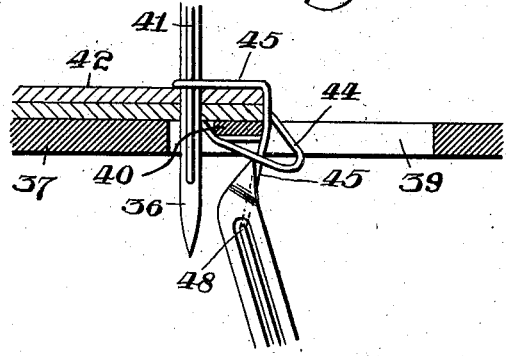
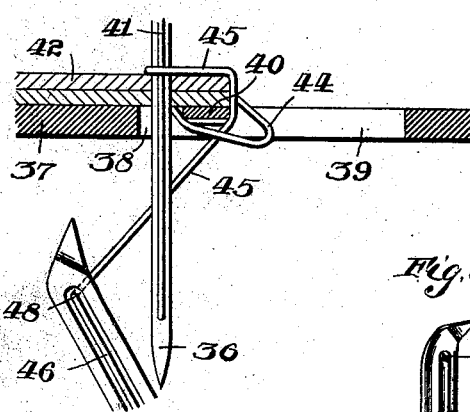
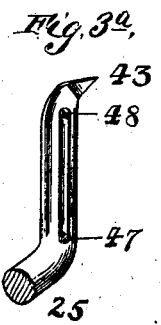
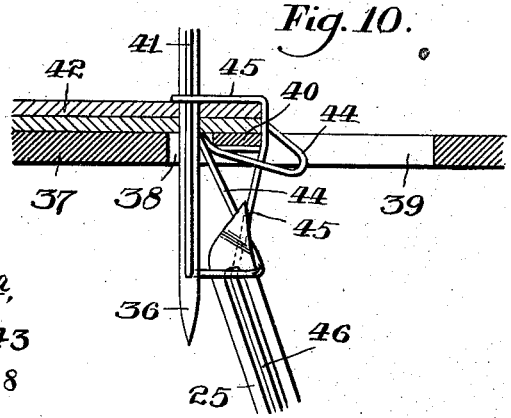
Witnesses.
A. V. Groupe
Thomas O'Yates
Inventors
Wm. H. Hugg
Conrad Schütz
By Charles N. Butler
Attorney.

(No Model.) 4 Sheets—Sheet 4.

W. H. HUGG & C. SCHÜTZ
SEWING MACHINE.

No. 595,479. Patented Dec. 14, 1897.

Witnesses.
A. V. Groupe
Thomas S. Yates

Inventors
Wm. H. Hugg,
Conrad Schütz,
By Charles N. Butler
Attorney.

UNITED STATES PATENT OFFICE.

WILLIAM H. HUGG, OF PALMYRA, NEW JERSEY, AND CONRAD SCHÜTZ, OF PHILADELPHIA, PENNSYLVANIA.

SEWING-MACHINE.

SPECIFICATION forming part of Letters Patent No. 595,479, dated December 14, 1897.

Application filed September 16, 1896. Serial No. 605,968. (No model.)

*To all whom it may concern:*

Be it known that we, WILLIAM H. HUGG, of Palmyra, county of Burlington, State of New Jersey, and CONRAD SCHÜTZ, of Philadelphia, county of Philadelphia, State of Pennsylvania, citizens of the United States, have invented certain new and useful Improvements in Sewing-Machines, of which the following is a specification.

Our invention belongs to that class of sewing-machines known as "overseamers;" and it is adapted for forming an overedge seam of one or more threads, as in binding the edge of a fabric, uniting the edges of fabrics, stitching buttonholes, covering rings, and analogous uses.

The principal objects of our invention are, first, to provide a machine in which the thread is handled directly without transfer; second, to draw off only so much of the thread as is required to form the stitch, and thus to avoid the use of a take-up device; third, to permit of the use of a single-strand thread, such as is used in weaving the fabric, for forming the single-thread overseam, and for either or both threads in forming the double-thread overseam, thus avoiding the harsh edge finish in soft-knit garments produced by the use of hard twist-thread required for machines now in use; fourth, to avoid the use of a welt-guide by adapting the looper to control the edge of the fabric and regulate the length of the bight; fifth, to provide a machine of greater simplicity of construction and operation than has heretofore obtained, which is capable of attaining unlimited speed, whereby the defect of low speed of machines heretofore used is overcome, and, sixth, by the peculiar shape and motion of the looper to overcome the tendency to drop stitches and to improve or facilitate the casting off of the loop, which are defects of machines heretofore used.

The machine is provided with a reciprocating needle and a peculiarly-formed curve-pointed looper, which latter is caused to oscillate around the edge of the fabric in unison with the reciprocations of the needle therethrough, the looper describing in its travel more than half a circle, catching the needle-thread below the fabric and forming a loop thereof, which it carries over the edge in the operation of carrying the looper-thread through this needle-loop and into position to be engaged by the descending needle above the fabric. The looper-thread being caught by the descending needle, the looper recedes in unison therewith and drops through or casts off the needle-thread loop whereby the stitch is formed. The point of the looper is inclined to the plane of its motion to facilitate catching the thread from the needle below the fabric and is directed or pointed toward the outside of the curve which it describes around the edge of the fabric, the said point forming an obtuse angle with the looper-shank. The peculiar shape and motion of the looper cause no more thread to be drawn from the needle than is required to cover the edge of the fabric and leaves no more of its own thread engaged with the needle than is required to form the purl, whereby the use of a take-up device is avoided and the use of soft single-ply thread is made possible. The comparatively straight looper in receding drops out of the loop which it carries over the edge of the fabric without exerting any pull thereon, as a consequence of its peculiar shape and motion, thus avoiding dragging down the stitch.

The nature and characteristic features of our invention will be more fully understood from the following detailed description, taken in connection with the accompanying drawings, of which—

Figure 2:
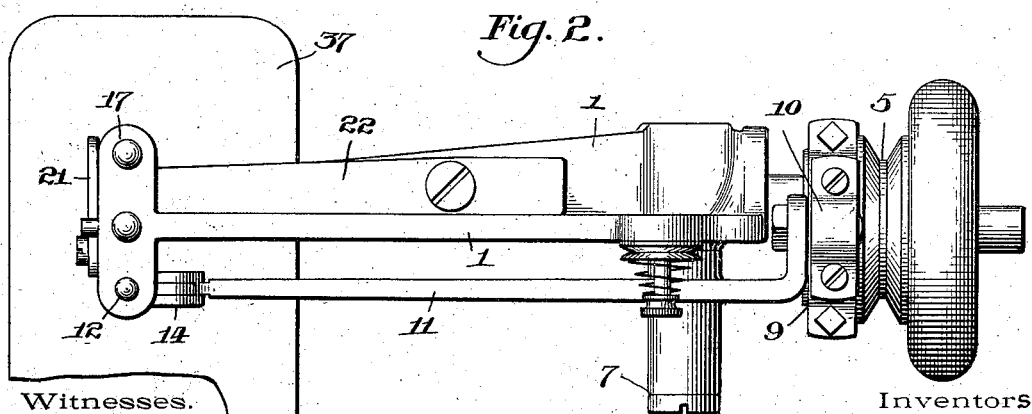
Figure 3:
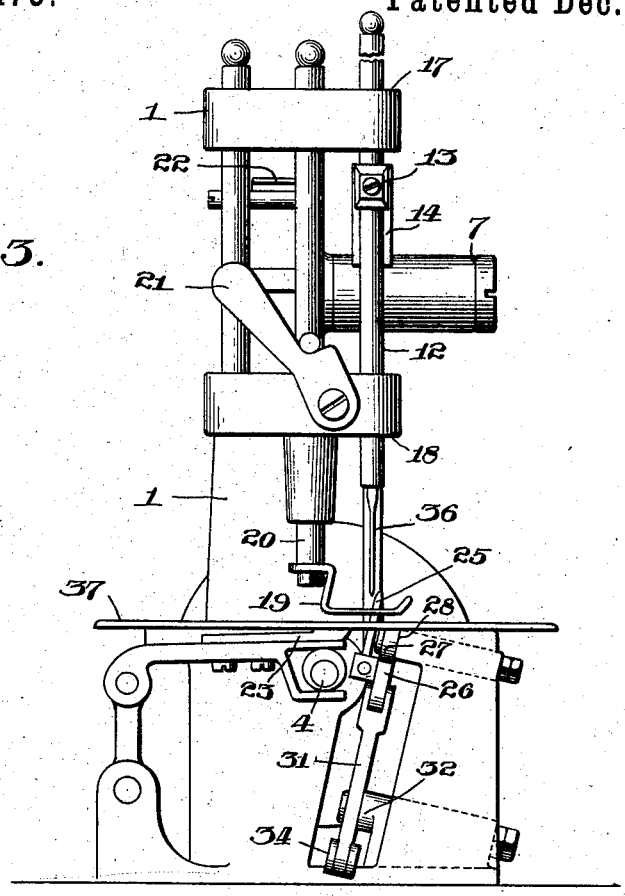
Figure 5:
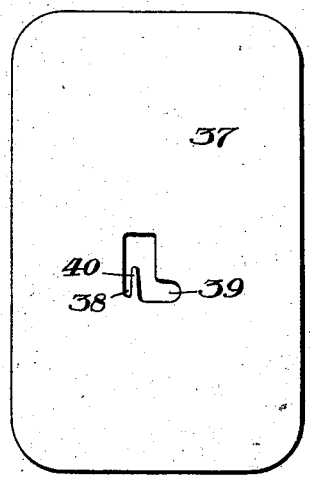
Figure 4:
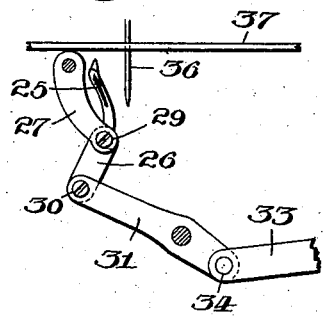
Figure 11:
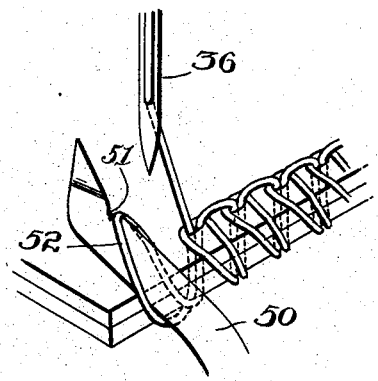
Figure 12:
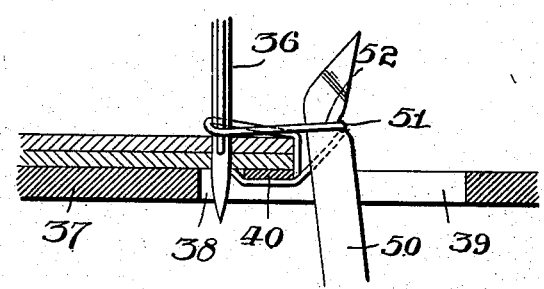

Figure 1 is a front elevation of a machine embodying the main features of our invention. Fig. 2 is a top or plan view of the same. Fig. 3 is an elevation of the left end of the machine. Fig. 3ª is a perspective view of the looper. Fig. 4 is a view of the link mechanism for operating the looper. Fig. 5 is a plan view of the throat-plate. Figs. 6, 7, 8, 9, and 10 are views illustrating the relative positions of the needle and looper in forming the double-thread overseam; and Figs. 11, 12, 13, and 14 are views illustrating the relative positions of the needle and looper in forming the single-thread overseam.

Referring to the drawings, the frame 1 is provided with bearings 2 and 3, and the shaft 4 is journaled in these bearings, being driven by the belt-pulley 5.

A bell-crank 6, journaled on an arbor 7, supported by the frame, is connected with and oscillated by the shaft 4 by means of the pitman 8, which has an eccentric connection 9 with the shaft and a ball-and-socket connection 10 with the bell-crank.

The horizontal arm 11 of the bell-crank is connected with and reciprocates the needle-bar 12, an adjustable block 13, secured to the needle-bar, being connected to the crank-arm by the link 14, which is pivoted to the block at 15 and to the arm at 16.

The needle-bar, reciprocating vertically in the bearings 17 and 18, the presser-foot 19 and bar 20, the elevating-lever 21, the depressing-spring 22, and the feed mechanism 23 all operate in the usual manner.

The vertical arm 24 of the bell-crank is connected with and oscillates the looper 25, which is secured to the link 26, for the upper end of the link 26 and an arm 27, pivoted to the frame at 28, are pivoted together at 29, and the lower end of the link is pivoted at 30 to the long arm of a lever 31, which is fulcrumed in the bearing 32 and has its short arm connected with the bell-crank by a link 33, pivoted at 34 and 35.

As the revolving shaft 4 reciprocates the needle 36 through the described intermediate mechanism it will also reciprocate the looper 25 in unison therewith by means of the described link mechanism and intermediate connections, the looper being caused to describe a curve whose upper and lower limits cross the needle in its vertical reciprocations.

The looper 25 is formed with a plain shank, and a point 43, which lies on the convex side of the curve described by the looper in its movement, is inclined to the plane of the looper's movement and forms an obtuse angle with the looper-shank, as illustrated in Fig. 3ª, the looper being provided with eyes 47 and 48, which receive the thread 46.

It will be observed that the action of the looper is positive and direct, for in the operations of seizing the thread, forming the loop and carrying it, the looper advances instead of receding, as is usual, which obviates a chief defect of overseaming mechanisms now in use, while the peculiar link motion carries the looper through its several positions at such angles that it may be made comparatively straight.

The plain of the looper and the mechanism connecting it with the bell-crank is inclined to the vertical and to the line of action of the needle, as illustrated in Fig. 3, and consequently the looper will pass in front of the needle in the upper limits of its path and to the rear in the lower limits, or to the right and to the left, respectively, in the position of the mechanism shown in Fig. 3.

The throat-plate 37 is provided with a slot 38, through which the needle reciprocates, and a slot 39, through which the looper reciprocates, the two slots being separated by a tongue 40, about which the stitch is formed and from which it readily slips as the material is advanced by the feed mechanism 23.

In forming the double-thread overseam the needle-thread 41, fed from a spool placed in any suitable position, is first carried by the needle through the fabric 42 and the slot 38, the needle and looper mechanism then occupying the position illustrated in Figs. 4 and 9. As the needle rises the thread between its eye and the fabric slackens and the looper-point 43, passing to the right and close to the rear of the needle, catches the thread and forms the loop 44, which is carried around the tongue 40 and the edge of the fabric through the successive positions illustrated in Figs. 10, 7, and 6. As the looper rises in unison with the ascending needle it slips through the loop 44, Fig. 6, and draws down the part 45 of the looper-thread, which part is caught by the needle as it descends close to the rear of the looper, as illustrated in Fig. 7. The looper descending with the needle readily draws out of the loop 44, as illustrated in Fig. 8, and the stitch is thus formed. It will be observed that the needle-thread is caught positively by the point of the advancing looper and merely pushed to the edge of the fabric where, by reason of its positive engagement with the loop and as its shape and motion are such that its shank approximately follows the path described by its point close around the edge of the fabric, the looper shoots through the loop without drawing it out, as illustrated in Fig. 6. When the descending needle has caught the looper-thread, the looper recedes, and as its shank follows the path of least resistance to the loop surrounding it and as its point forms an obtuse angle with the shank the needle-thread loop is shed without pulling off more than is required to form the stitch. It is evident that the looper, which has been carried past the point of the elevated needle only sufficiently to permit the needle on descending to engage the looper-thread, will on receding leave only so much of its thread as is required to form the stitch. The successive stitches are formed by a repetition of this operation. In forming the single-thread overseam the same mechanism is employed. It is found desirable, however, to form a notch 51 in the looper at the base of the hook to prevent the loop from slipping down on the looper, as is required in forming the double-thread seam.

Figure 13:
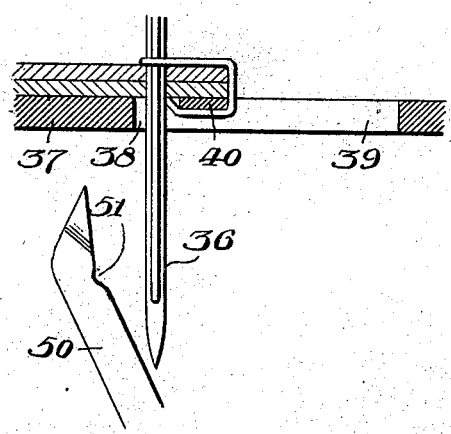
Figure 14:
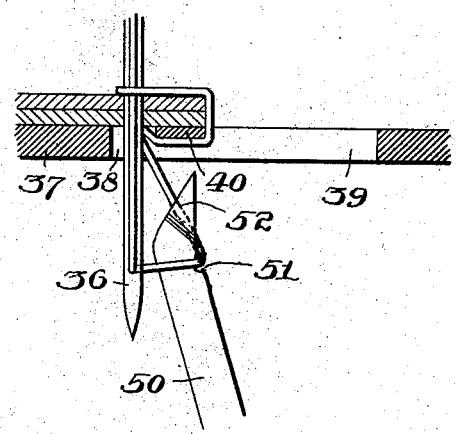

Referring to Figs. 11, 12, 13, and 14, when the needle has passed through the fabric and the throat-plate slot 38 and is rising the looper 50, passing to the rear of the needle, engages the slackened thread and forms the loop 52, which is caught in the looper-notch 51, as illustrated in Figs. 13 and 14. As the needle rises the looper carries this loop around the tongue 40 and the edge of the fabric from the position shown in Fig. 14 to that shown in Fig. 11. The needle, now descending, passes close to the rear of the looper and enters the loop 52, Fig. 12, which the descending looper casts off, the parts resuming the position shown in Fig. 13, and the stitch being thus formed. As the point of the looper travels in a path close to the edge of the fabric and substantially coincident with the position to be occupied by the loop, merely pushing the loop into its desired position, where it is caught by the descending needle, and on receding dropping out of the loop, only so much of the thread is drawn off as is required to form the stitch. The successive stitches are formed by a repetition of this operation. As the path of the looper follows closely the line around the edge of the fabric occupied by the loop, no more thread is drawn off than is required to form the stitch, which obviates the use of a take-up device. As the shape of the looper and its action are such that no take-up device is required, a single-strand thread may be employed in both the needle and the looper for both the single and double thread seam. The looper-shank, striking close to the throat-plate tongue, guides the edge of the material and regulates the length of the bight, it being evident that its action will be to roll in any excess of material between the needle and the point which it strikes. As the loop is caught positively around the looper, which advances in carrying it around the edge of the fabric, it is impossible for the loop to slip off or be dropped until the looper begins to recede, when the peculiar shape of the looper permits it to be readily cast off.

Having thus described the nature and objects of our invention, we claim as new and desire to secure by Letters Patent—

1. In a sewing-machine, in combination, a reciprocating needle, a curve-pointed looper which oscillates in a curved path and has its point directed outwardly from said curved path, a link to which said looper is attached, an arm having one end pivoted to said link and the other end pivoted to a fixed support, an oscillating lever fulcrumed in a fixed support and pivoted to said link, a throat-plate, and mechanism connecting said needle and looper mechanism, whereby they are adapted to operate in unison, substantially as and for the purposes specified.

2. In a sewing-machine, in combination, a reciprocating needle, a throat-plate having a tongue, an oscillating curve-pointed thread-carrying looper, means to cause said looper to enter the thread-loop formed by said needle upon the under side of said throat-plate and to carry it to the edge of said plate, and passing farther thereinto to yield a loop of its own thread to form a purl on the edge or border of the fabric, said means comprising a link to which said looper is attached, an arm having one end pivoted to said link and the other end pivoted to a fixed support, an oscillating lever fulcrumed to a fixed support and pivoted to said link, and mechanism connecting said needle and looper, substantially as and for the purposes specified.

3. In a sewing-machine, a curve-pointed looper provided with two eyes, said looper oscillating in a curved path and having its point directed outwardly from said curved path, a link to which said looper is connected an arm having a movable connection with said link at one end and with a fixed support at the other end, a lever having one of its ends connected with said link, and means for actuating said lever thereby causing said looper to oscillate, substantially as and for the purposes specified.

4. In a sewing-machine, in combination, a revolving shaft, a pitman connected with and oscillated by said shaft, a bell-crank connected with and oscillated by said pitman, a needle connected with and oscillated by said bell-crank, a link, and a looper fixed thereon, an arm having one end pivoted to said link and the other end pivoted to a fixed support, a lever fulcrumed to a fixed support and having one end pivoted to said link, and a second link connecting said fulcrumed lever with said bell-crank, substantially as and for the purposes specified.

5. In a sewing-machine, in combination, a reciprocating needle, a throat-plate, a looper and means to oscillate it in a curved path through said throat-plate and around the edge of the fabric, said looper comprising a plain shank and a point which is turned toward the outside of said curved path and forms an obtuse angle with said shank, and mechanism connecting said needle and looper, whereby they are operated in unison, as specified.

6. In a sewing-machine, in combination, a reciprocating needle, a throat-plate, a looper and means to oscillate it in a curved path through said throat-plate and around the edge of the fabric, said looper comprising a plain shank and a point which is turned toward the outside of said curved path and forms an obtuse angle with said shank, said point being also inclined to the plain of said curve, and mechanism connecting said needle and looper, whereby they are operated in unison, as specified.

WM. H. HUGG.
CONRAD SCHÜTZ.

Witnesses:
THOMAS S. GATES,
CHARLES N. BUTLER.